US008634084B2

(12) United States Patent
Suzuki

(10) Patent No.: US 8,634,084 B2
(45) Date of Patent: Jan. 21, 2014

(54) DATA PROCESSING SYSTEM AND IMAGE FORMING APPARATUS

(75) Inventor: Katsunori Suzuki, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 365 days.

(21) Appl. No.: 13/069,597

(22) Filed: Mar. 23, 2011

(65) Prior Publication Data

US 2011/0235081 A1 Sep. 29, 2011

Related U.S. Application Data

(60) Provisional application No. 61/318,463, filed on Mar. 29, 2010.

(51) Int. Cl.
*H04N 1/40* (2006.01)
*H04N 1/32* (2006.01)
*H04N 1/405* (2006.01)

(52) U.S. Cl.
CPC .................. *H04N 1/4051* (2013.01)
USPC .............. 358/1.13; 358/444; 358/468

(58) Field of Classification Search
USPC ................ 358/448, 446, 444, 404, 1.13, 468
See application file for complete search history.

(56) References Cited

U.S. PATENT DOCUMENTS

| 6,012,151 | A  | * | 1/2000 | Mano ............................ 714/11 |
| 8,276,204 | B2 | * | 9/2012 | Ogawa .......................... 726/22 |
| 2003/0187958 | A1 | * | 10/2003 | Aoki ............................. 709/219 |
| 2005/0114696 | A1 | * | 5/2005 | Hashimoto ................... 713/200 |
| 2007/0216941 | A1 | * | 9/2007 | Jingu ........................... 358/1.15 |
| 2008/0127307 | A1 |   | 5/2008 | Fukuta |
| 2009/0244080 | A1 | * | 10/2009 | Ishikura ....................... 345/560 |
| 2013/0088741 | A1 | * | 4/2013 | Murata et al. ................ 358/1.14 |

FOREIGN PATENT DOCUMENTS

| JP | 2003-228508 | 8/2003 |
| JP | 2006-341591 | 12/2006 |
| JP | 2007-311872 | 11/2007 |

* cited by examiner

*Primary Examiner* — Jerome Grant, II
(74) *Attorney, Agent, or Firm* — Turocy & Watson, LLP

(57) ABSTRACT

A data processing system includes a memory in which a set value based on a compliance requirement is stored for each of plural operating functions provided in an image forming apparatus, and a controller which outputs correspondence data indicating correspondence between the plural operating functions and the set value based on the compliance requirement.

9 Claims, 11 Drawing Sheets

FIG. 5

| DEVICE | JOB | LOG | REGISTRATION | COUNTER | USER MANAGEMENT | MANAGER | MAINTENANCE WORKER |

SETUP   SECURITY   MAINTENANCE   REGISTRATION   COMPLIANCE

COMPLIANCE

SELECT COMPLIANCE | SET COMPLIANCE ITEM | PRINT LIST | IMPORT | EXPORT | REFERENCE | WEB SERVICES | CHECK

COMPLIANCE NAME: IEEE2600    FILTER:ALL

| ITEM | ITEM SUPPLEMENT | INITIAL VALUE IN NORMAL MODE | INITIAL VALUE IN COMPLIANCE MODE | CURRENT SET VALUE |
|---|---|---|---|---|
| DEVICE SETTING: | | | | |
| FTP SAVING | VALID/INVALID | VALID | INVALID | INVALID |
| FAX TRANSMISSION | VALID/INVALID | VALID | INVALID | INVALID |
| PC-iFAX | VALID/INVALID | VALID | INVALID | INVALID |
| PC-FAX | VALID/INVALID | VALID | INVALID | INVALID |
| WEB SERVICE SCAN | VALID/INVALID | VALID | INVALID | INVALID |
| SNTP SETTING: | | | | |
| NTP AUTHENTICATION | VALID/INVALID | INVALID | VALID | VALID |
| ADDRESS BOOK OPERATION RIGHT: | | | | |
| CONTROL ON ADMINISTRATION RIGHT | 0:UNLIMITED/1:MANAGER | INVALID | VALID | VALID |
| DEPARTMENT MANAGEMENT SETTING: | | | | |
| PRINT JOB WITHOUT CODE | PRINT/DELETE/INVALID | PRINT | INVALID | INVALID |
| USER MANAGEMENT SETTING: | | | | |
| USER AUTHENTICATION | VALID/INVALID | INVALID | VALID | VALID |
| PRINT JOB WHEN AUTHENTICATION FAILS | PRINT/DELETE | PRINT | DELETE | DELETE |

[ NEXT ]

105 an image forming apparatus.

DATA PROCESSING SYSTEM AND IMAGE FORMING APPARATUS

CROSS-REFERENCE TO RELATED APPLICATION(S)

This application is based upon and claims the benefit of priority from: U.S. provisional application 61/318,463, filed on Mar. 29, 2010; the entire contents of which are incorporated herein by reference.

FIELD

Embodiments described herein relate generally to a data processing system and an image forming apparatus.

BACKGROUND

Operating functions of an image forming apparatus include copy function, print function, scan function, FAX function, network function, security function, and authentication function. A user can use the image forming apparatus with a sense of security when the image forming apparatus becomes a target of IT management and achieves security compliance. It is troublesome to set security compliance for each operating function by operating a setting screen for each operating function.

DESCRIPTION OF THE DRAWINGS

FIG. 5 shows a screen displaying the setting information of security compliance.

DETAILED DESCRIPTION

Figure 1:
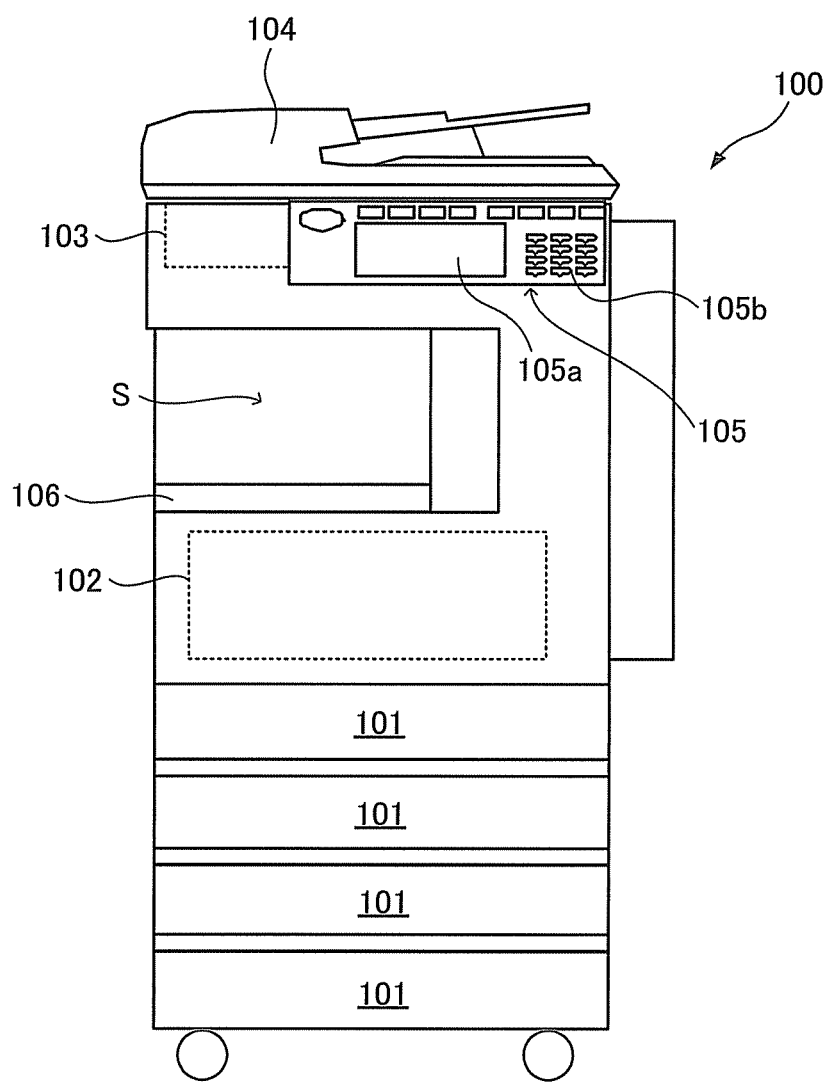
FIG. 1 schematically shows an image forming apparatus.

According to an embodiment, a data processing system includes a memory in which a set value based on a compliance requirement is stored for each of plural operating functions provided in an image forming apparatus, and a controller which outputs correspondence data indicating correspondence between the plural operating functions and the set value based on the compliance requirement.
First Embodiment
An image forming apparatus 100 has plural paper supply cassettes 101. Each paper supply cassette 101 accommodates plural sheets. The plural sheets accommodated in each paper supply cassette 101 pass through a sheet carrying path and are supplied to an image forming unit 102. The image forming unit 102 forms a developer image on the sheets, based on image data. The image data include image data transmitted to the image forming apparatus 100 from an external device (for example, a personal computer) and image data generated on reading by a scanner 103.

The scanner 103 scans an image of a document and thus generates image data. FIG. 1 shows a part of the scanner 103. An auto document feeder 104 which automatically carries a document to the scanner 103 is provided above the scanner 103.

There is a control panel 105 in an upper part of the image forming apparatus 100. The control panel 105 is used to input various kinds of information to the image forming apparatus 100 and to display various kinds of information. The control panel 105 has a display 105a and button switches 105b.

The display 105a displays a color image. If a so-called touch panel display is used as the display 105a, specific information can be inputted and displayed.

The image forming unit 102 forms an electrostatic latent image corresponding to image data on a photoconductive face of a photoconductive member and then supplies a toner to form a developer image. The image forming unit 102 transfers the developer image formed on the surface of the photoconductive member to a sheet. The image forming unit 102 can transfer the developer image to the sheet by causing the sheet to contact the surface of the photoconductive member. The developer image on the photoconductive member can also be transferred to an intermediate transfer belt and then the developer image can be transferred from the intermediate transfer belt to the sheet.

The image forming unit 102 fixes the developer image to the sheet with heating by a fixing device. The sheet to which the developer image is fixed passes through the sheet carrying path and reaches a paper discharge space S. In the paper discharge space S, there is a paper discharge tray 106 for sheets to be stacked on.

Figure 2:
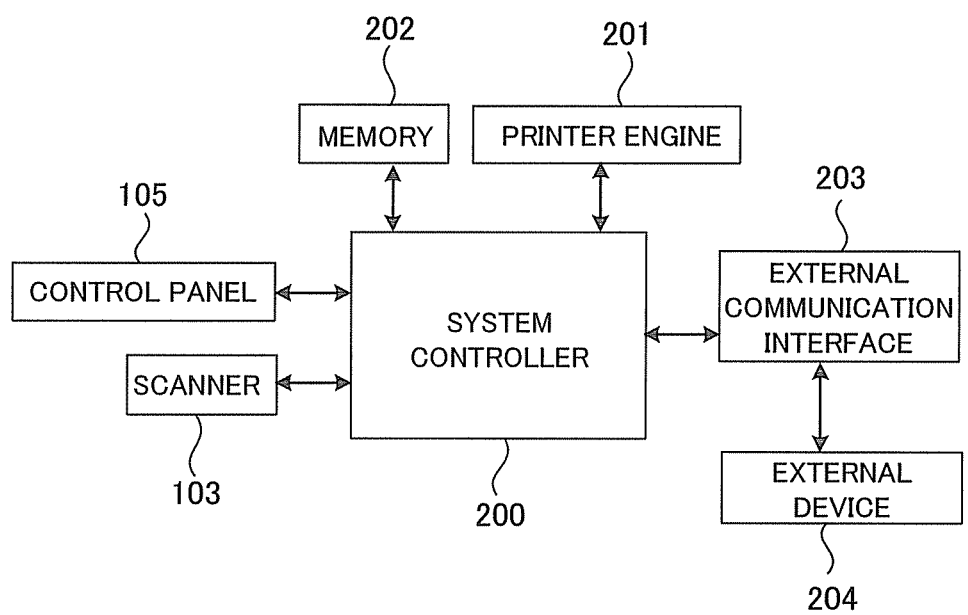
FIG. 2 shows the circuit configuration of the image forming apparatus.

FIG. 2 shows a principal circuit configuration of the image forming apparatus 100.

A system controller 200 controls the operations of the image forming apparatus 100. A printer engine 201 controls the operations of the image forming unit 102. In a memory 202, various kinds of information are stored. In this embodiment, a set value based on security compliance for each of plural operating functions provided in the image forming apparatus 100 is stored in the memory 202.

The operating functions provided in the image forming apparatus 100 are operating functions achieved by the image forming apparatus 100. These functions include, for example, print function, copy function, scan function, FAX function, filing function, and network function.

An external communication interface 203 is used to communicate with an external device 204 arranged outside of the image forming apparatus 100. The external device 204 may be an external memory (for example, USB memory). By having the external memory connected to the external communication interface 203, the system controller 200 can read out data stored in the external memory and store data into the external memory.

The external device 204 may be a server. The external communication interface 203 can connect to the server via a network. The system controller 200 can communicate data with the server via the external communication interface 203. Specifically, the system controller 200 can store data in the server and read out data stored in the server.

Figure 3:
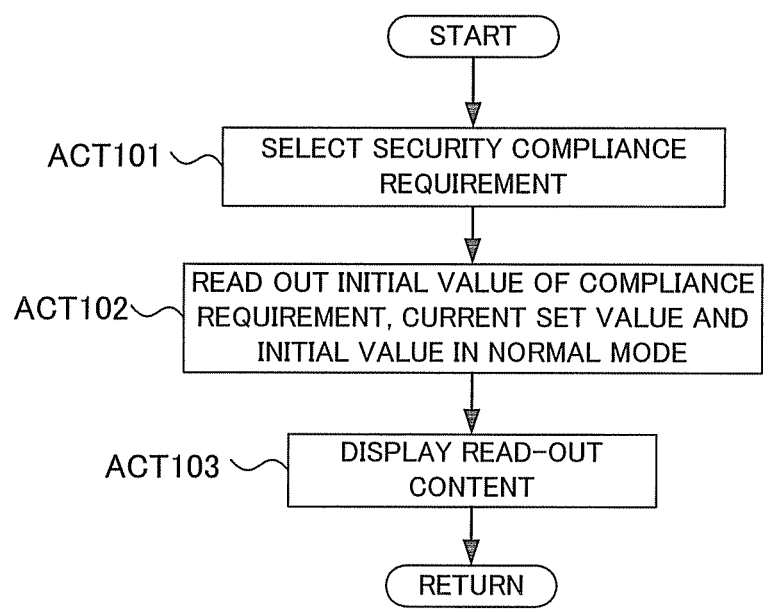
FIG. 3 is a flowchart showing processing to display setting information of security compliance.

Next, a method for displaying security compliance will be described. FIG. 3 is a flowchart showing processing to display setting contents of security compliance for each operating function provided in the image forming apparatus 100.

Figure 4:
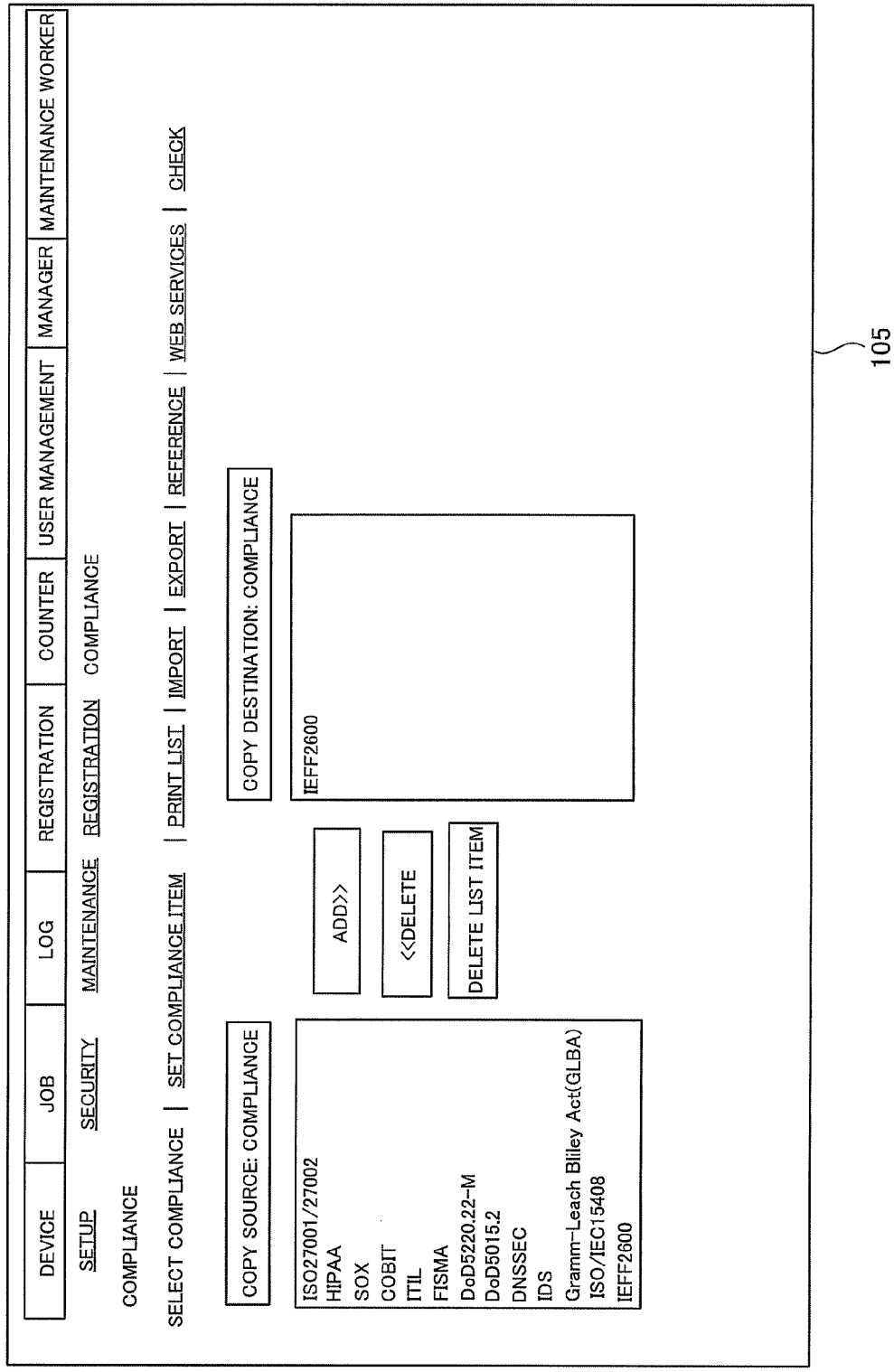
FIG. 4 shows a selection screen for security compliance.

The system controller 200 displays the information shown in FIG. 4 on the control panel 105 (ACT 101). When an item "Select compliance" is selected by the user from among the displayed contents shown in FIG. 4, the system controller 200 displays the contents shown in FIG. 4 on the control panel 105.

In FIG. 4, plural security compliance requirements that can be selected by the user are displayed below "Copy source: compliance". Below "Copy destination: compliance", a security compliance requirement selected by the user is displayed. In FIG. 4, IEEE 2600 is selected as a security compliance requirement.

When the control panel 105 is displaying the contents shown in FIG. 4, the user selects an arbitrary security compliance requirement from among the plural security compliance requirements (ACT 101).

When an item "Set compliance item" shown in FIG. 4 is selected by the user, the system controller 200 reads out an initial value in a normal mode, an initial value of the selected security compliance requirement, and a current set value of the image forming apparatus 100, from the memory 202 (ACT 102).

The normal mode is a mode in which no security compliance requirements are set. The initial value of the security compliance requirement is a content that is preset for each operating function of the image forming apparatus when the security compliance requirement is set. The current set value of the image forming apparatus 100 is a content set for each operating function in the current image forming apparatus 100.

The system controller 200 displays the content read out from the memory 202 in ACT 102, on the control panel 105 (ACT 103). Specifically, the system controller 200 displays the content shown in FIG. 5 on the control panel 105.

In the display list shown in FIG. 5, "Item" refers to the operating functions provided in the image forming apparatus 100 and "Item supplement" explains the setting contents of the items.

In FIG. 5, the initial value in the normal mode and the initial value of the selected security compliance requirement, and the current set value are displayed in association with each operating function provided in the image forming apparatus 100. By viewing the displayed content on the control panel 105, the user can confirm the setting content (current set value) for the operating function corresponding to security compliance, of the operating functions of the image forming apparatus 100. The user can also confirm the initial value of the selected security compliance requirement and the initial value in the normal mode.

Figure 6:
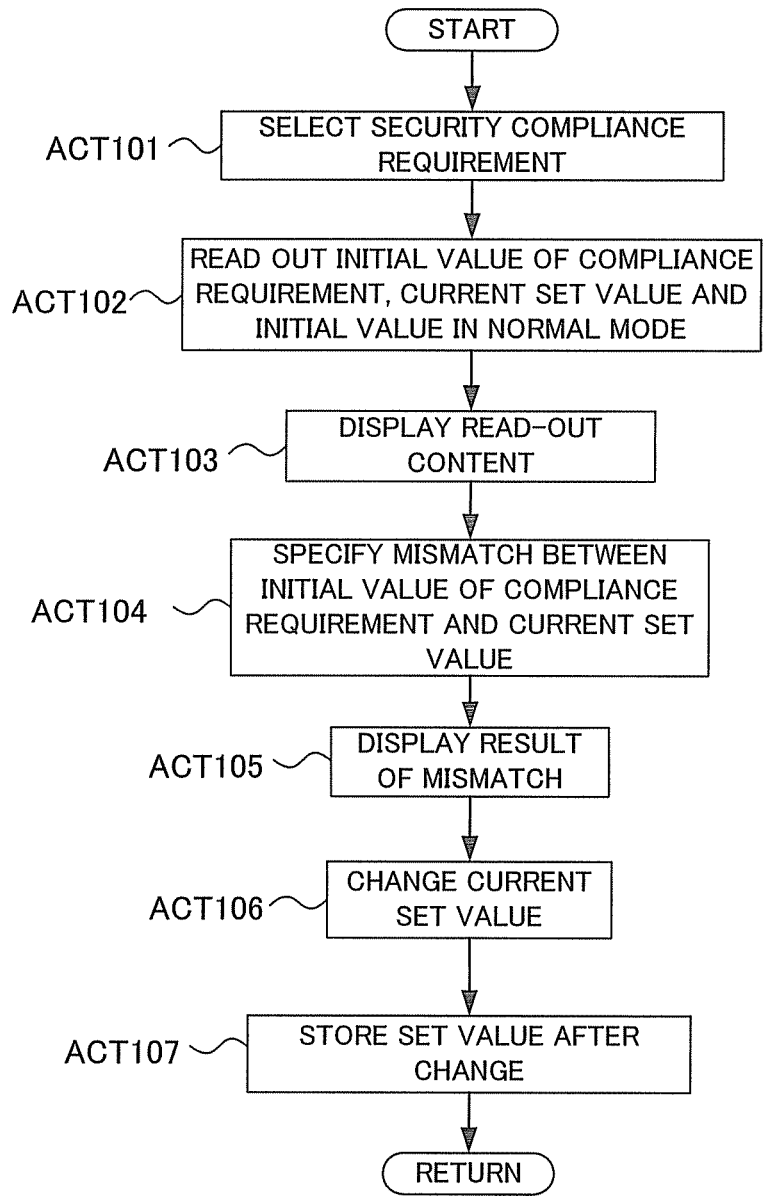
FIG. 6 is a flowchart showing processing to change a current set value based on an initial value of security compliance.

Next, a method for setting security compliance will be described. FIG. 6 is a flowchart showing processing to change the setting contents of security compliance for each operating function of the image forming apparatus 100.

Figure 7:
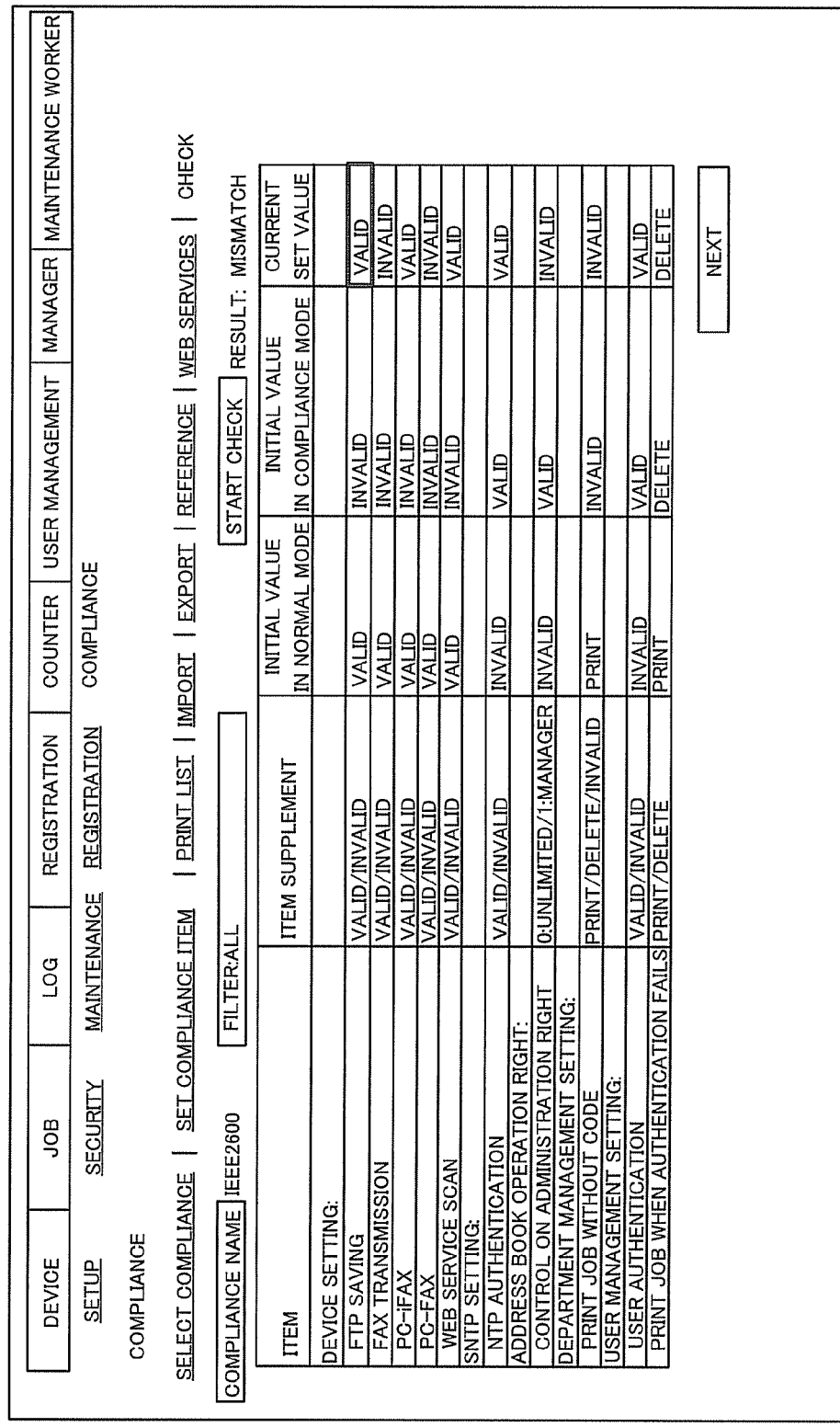
FIG. 7 shows the matching state and mismatching state between the initial value of security compliance and the current set value.

When an item "Check" is selected by the user, as shown in FIG. 7, the system controller 200 compares the initial value of the security compliance requirement with the current set value and specifies a mismatching setting content (ACT 104).

When the initial value of the security compliance requirement and the current set value do not match, the system controller 200 discriminates the mismatching current set value and the matching current set value in the display on the control panel 105 (ACT 105). For example, discrimination can be made by displaying the mismatching setting content in a different color from the matching setting content. It suffices to enable the user to discriminate the mismatching setting content and the matching setting content in the display on the control panel 105.

When the current set value shows a lower security level than the initial value of the security compliance requirement, the user can be alerted. Alert measures may include using the display on the control panel 105, using a sound, or turning on an alert lamp provided in the image forming apparatus 100. It suffices to be able to notify the user that the current set value shows a lower security level than the initial value of the security compliance requirement.

By viewing the displayed content on the control panel 105, the user can confirm the difference between the initial value of the security compliance requirement and the current set value. The user can change the current set value after confirming the difference between the initial value of the security compliance requirement and the current set value.

Specifically, the user selects the set value corresponding to the operating function to be changed, from among the current set values on the control panel 105. The control panel 105 outputs the user-selected information to the system controller 200. The system controller 200 receives the user-selected information and changes the current set value (ACT 106). For example, in the displayed content shown in FIG. 7, when the current set value corresponding to the operating function of FTP saving is selected, "Valid" can be changed to "Invalid".

The system controller 200 stores the changed set value in the memory 202 (ACT 107).

In the processing shown in FIG. 6, the current set value is changed. However, the initial value of a security compliance requirement can be changed, too. Processing to change the initial value of a security compliance requirement is similar to FIG. 6.

Specifically, the user selects the initial value corresponding to an arbitrary operating function, from among the initial values of security compliance requirements on the control panel 105. The system controller 200 receives the user-selected information and changes the initial value of the security compliance requirement.

The system controller 200 stores the changed initial value of the security compliance requirement in the memory 202. The changed value of the security compliance requirement is stored in the memory 202 in the state of being discriminated from the initial value. For example, by changing the file name, the changed value and the initial value can be discriminated and stored in the memory 202.

Figure 8:
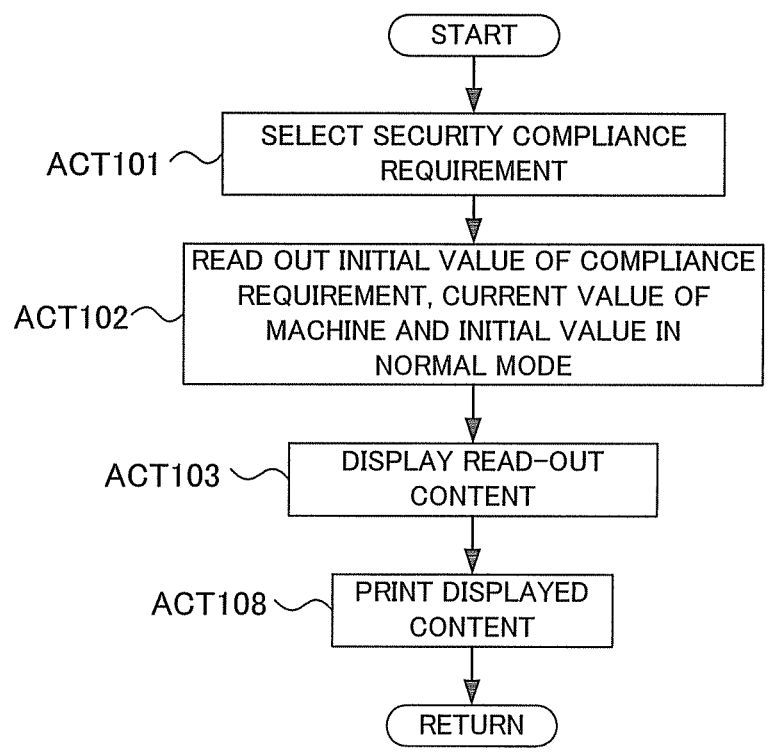
FIG. 8 is a flowchart showing processing to print setting contents of security compliance.

Next, processing to print setting contents of security compliance will be described. FIG. 8 is a flowchart showing processing to print the displayed content on the control panel 105.

Figure 9:
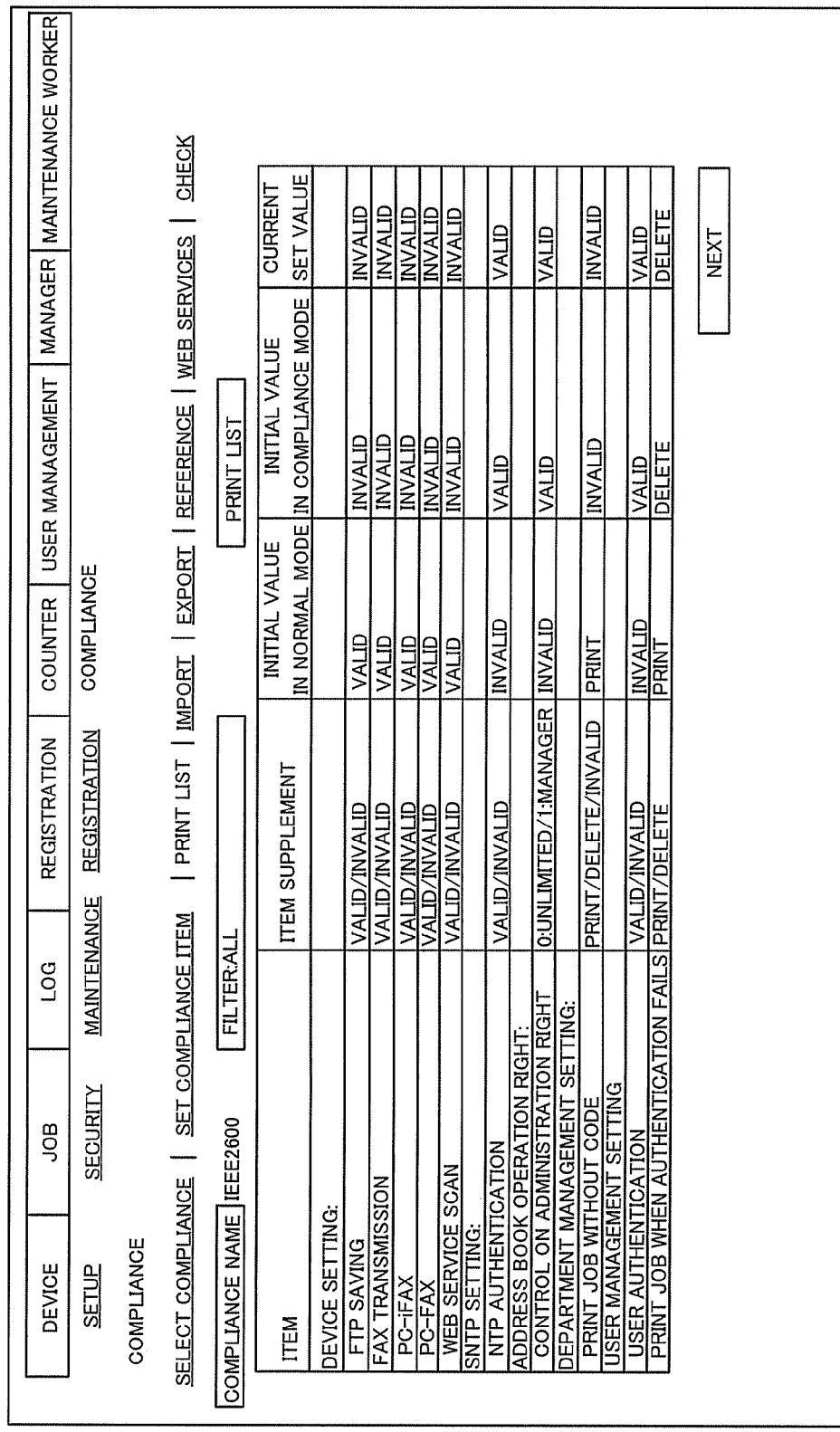
FIG. 9 shows a print screen for the setting contents of security compliance.

As shown in FIG. 9, when an item "Print list" is selected by the user, the system controller 200 displays the content shown in FIG. 9 on the control panel 105. When a button "Print list" is pressed by the user, the system controller 200 prints the content displayed on the control panel 105 (ACT 108).

Specifically, the system controller 200 outputs data representing the displayed content on the control panel 105 to the printer engine 201. The image forming unit 102 prints the displayed content shown in FIG. 9, on a sheet. The image printed on the sheet may be the entire displayed content shown in FIG. 9 or may be a part of the displayed content. It suffices that the printed image includes "Item", "Item supplement", "Initial value in normal mode", "Initial value of compliance", and "Current set value".

Figure 10:
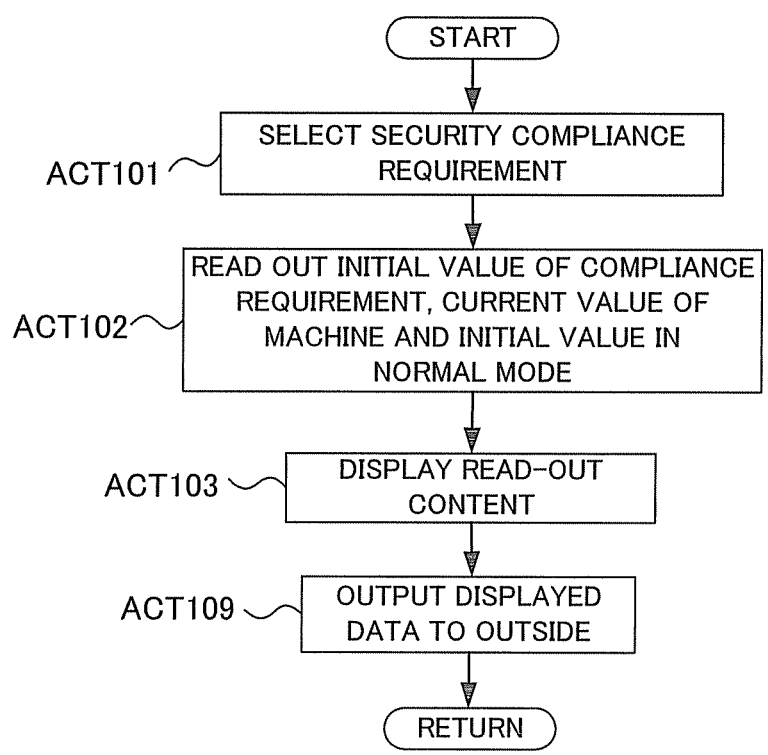
FIG. 10 is a flowchart showing processing to output the setting contents of security compliance to an external device.

Next, a method for transmitting setting information of security compliance to outside of the image forming apparatus 100 will be described. FIG. 10 is a flowchart showing processing to transmit data of the displayed content on the control panel 105 to the external device 204 via the external communication interface 203.

When an item "Export" is selected by the user from among the displayed contents shown in FIG. 5, the system controller 200 transmits data representing the contents displayed on the control panel 105 to the external device 204 via the external communication interface 203 (ACT 109). The setting information of security compliance can be stored in the external device 204.

When the current set value and the initial value of the security compliance requirement are not changed, the current set value and the initial value of the security compliance requirement can be stored in the external device 204. When the current set value is changed, the set value after the change can be stored in the external device 204. When the initial value of the security compliance requirement is changed, the changed value of the security compliance requirement can be stored in the external device 204. When the external device 204 is connected to the external communication interface 203, the system controller 200 can read out information stored in the external device 204.

In this embodiment, one security compliance requirement is selected. However, plural security compliance requirements can also be selected. When plural security compliance requirements are selected, the initial values of the selected plural security compliance requirements are displayed in plural lines in the item "Initial value in compliance mode" shown in FIG. 5.

According to this embodiment, plural operating functions provided in the image forming apparatus 100 and setting contents of security compliance corresponding to each operating function can be confirmed simultaneously. As information showing the correspondence between the plural operating functions and the setting contents of security compliance is printed on a sheet, the user can confirm the setting contents of security compliance for each operating function while viewing the sheet.

According to this embodiment, setting of security compliance can be easily changed for plural operating functions.

Figure 11:
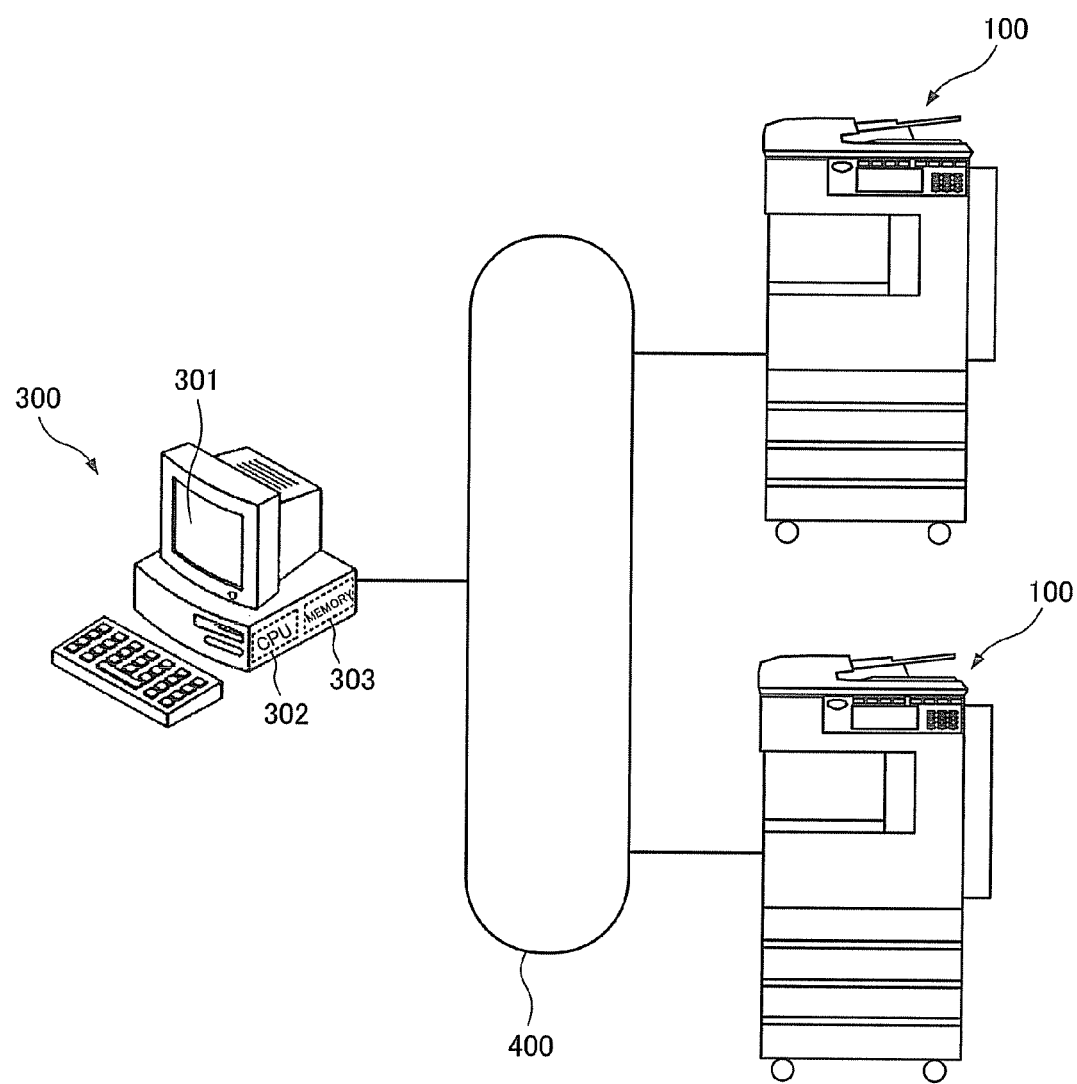
FIG. 11 shows the configuration of a system including the image forming apparatus and a PC.

The displayed content on the control panel 105 can also be displayed on a display 301 of a PC (personal computer) 300, as shown in FIG. 11. A CPU 302 of the PC 300 controls the displaying on the display 301.

The CPU 302 of the PC 300 transmits a signal requesting the setting content of security compliance to a specified image forming apparatus 100 via a network 400. The system controller 200 of the image forming apparatus 100 receives the request from the CPU 302 and reads out information about the setting content of security compliance from the memory 202 and transmits the information to the PC 300. The information transmitted to the PC 300 includes "Item", "Item supplement", "Initial value of compliance", and "Current set value" shown in FIG. 5.

The CPU 302 receives the information from the image forming apparatus 100 and displays the content similar to FIG. 5, on the display 301. The PC 300 can perform the processing described with reference to FIG. 6, FIG. 8 and FIG. 10. The operation of the CPU 302 is performed according to a program stored in a memory 303.

When the initial value of the security compliance requirement or the current set value is changed in the PC 300, the change information is transmitted to the image forming apparatus 100. When printing the setting content of security compliance, the PC 300 transmits a print job to the image forming apparatus 100. If an external storage device is connected to the PC 300, the CPU 302 can store the data displayed on the display 301 into the external storage device.

The CPU 302 of the PC 300 compares the initial value of the security compliance requirement with the current set value. When the current set value shows a lower security level than the initial value of the security compliance requirement, the CPU 302 can alert the user. For example, the CPU 302 can display an alert screen on the display 301 or generate an alert sound. It suffices to be able to notify the user that the current set value shows a lower security level than the initial value of the security compliance requirement.

In this embodiment, information about setting of security compliance is stored in the memory 202 provided in the image forming apparatus 100. However, the information about setting of security compliance can be stored in a server provided outside of the image forming apparatus 100. The image forming apparatus 100 and the server are connected with each other via a network. The system controller 200 of the image forming apparatus 100 can read out information stored in the server and store information in the server via the network.

A program to execute the processing described in the embodiment is stored in advance in the memory 202 provided in the image forming apparatus 100. However, the program can be handled using other measures. For example, the program can be downloaded to the image forming apparatus 100 via a network or the program can be stored in a computer-readable recording medium.

The recording medium can be any recording medium which is capable of storing the program therein and is computer-readable. The recording medium may be, for example, an internal storage device that is internally loaded in a computer, such as ROM or RADII, a portable storage medium such as CD-ROM, flexible disk, DVD disk, magneto-optical disk or IC card, a database which holds a computer program, another computer and its database, or a transmission medium on a channel.

Operating functions that are acquired by installation or download may be realized in cooperation with the OS (operating system) of the image forming apparatus, for example. The program may be partly or entirely made up of execution modules that are dynamically generated. Various kinds of processing realized by causing the processor to execute the program can be executed at least partly by an ASIC (application specific integrated circuit) in a circuit-based manner.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data processing system comprising:
    a memory in which a set value based on a compliance requirement is stored for each of plural operating functions provided in an image forming apparatus and in which a current set value for each of the operating functions is stored; and
    a controller which outputs correspondence data indicating correspondence among the plural operating functions, the set value based on the compliance requirement and the current set value and, when the current set value and the set value based on the compliance requirement do not match, outputs information about mismatch.

2. The system according to claim 1, wherein in the memory, the set value based on each of plural compliance requirements is stored for each of the operating functions, and the controller receives a selection of an arbitrary compliance requirement, of the plural compliance requirements, and reads out the set value of the selected compliance requirement for each of the operating functions, from the memory.

3. The system according to claim 1, further comprising a display which displays the correspondence data based on an output from the controller.

4. The system according to claim 1, further comprising an external interface to which an external device is connected and which transmits the correspondence data to the external device.

5. The system according to claim 1, further comprising an external interface to which an external device is connected, wherein the controller transmits and receives the correspondence data to and from the external device via the external interface.

6. The system according to claim 1, further comprising an image forming unit which forms an image equivalent to the correspondence data, on a sheet.

7. The system according to claim 1, wherein the controller receives an input from a user and changes the set value based on the compliance requirement.

8. The system according to claim 1, wherein the controller receives an input from a user and changes the current set value.

9. The system according to claim 1, wherein when the current set value shows a lower security level than the set value based on the compliance requirement, the controller outputs alert information.

* * * * *